United States Patent [19]
Mason

[11] Patent Number: 5,618,440
[45] Date of Patent: Apr. 8, 1997

[54] METHOD AND APPARATUS FOR TREATING AND DISINFECTING WATER AND/OR WASTEWATER

[75] Inventor: James A. Mason, Theodore, Ala.

[73] Assignee: George L. Williamson, Fairhope, Ala.

[21] Appl. No.: 644,741

[22] Filed: May 10, 1996

Related U.S. Application Data

[63] Continuation-in-part of Ser. No. 352,583, Dec. 9, 1994, abandoned, which is a continuation-in-part of Ser. No. 65,402, May 24, 1993, abandoned, which is a continuation-in-part of Ser. No. 898,509, Jun. 15, 1992, abandoned, which is a continuation-in-part of Ser. No. 876,292, Apr. 30, 1992, abandoned, which is a continuation-in-part of Ser. No. 763,185, Sep. 20, 1991, Pat. No. 5,122,282, which is a continuation-in-part of Ser. No. 579,167, Sep. 7, 1990, abandoned, which is a continuation-in-part of Ser. No. 438,847, Nov. 20, 1989, abandoned.

[51] Int. Cl.$^6$ ..................................................... C02F 1/76
[52] U.S. Cl. .......................... 210/716; 210/756; 210/764; 210/198.1; 210/205; 210/192; 422/37; 422/189; 422/225; 422/226; 423/477
[58] Field of Search ..................................... 210/716, 764, 210/756, 198.1, 205, 192; 422/37, 225, 226, 189; 366/177; 423/477

[56] References Cited

U.S. PATENT DOCUMENTS

| | | | |
|---|---|---|---|
| 2,969,280 | 1/1961 | Peck | 422/225 |
| 3,257,171 | 6/1966 | Muench et al. | 422/225 |
| 3,426,083 | 2/1969 | Otten et al. | 422/225 |
| 3,826,816 | 7/1974 | McCormick | 422/225 |
| 4,075,308 | 2/1978 | Rapson et al. | 423/481 |
| 4,084,747 | 4/1978 | Alliger | 424/65 |
| 4,086,329 | 4/1978 | Cowley et al. | 423/481 |
| 4,543,243 | 9/1985 | Fröhler et al. | 423/481 |
| 4,585,482 | 4/1986 | Tice et al. | 106/15.05 |
| 5,017,728 | 5/1991 | McKonnie | 422/225 |

Primary Examiner—Neil McCarthy
Attorney, Agent, or Firm—George L. Williamson

[57] ABSTRACT

A novel method and apparatus is provided for treating and/or disinfecting water and/or wastewater wherein the contact chamber is sealed and under greater than atmospheric pressure having a detention time of no more than 5 minutes and further providing for generating a mixture containing chlorine dioxide having a product storage chamber connected to a first mixing chamber which is connected to a first storage chamber for storing chlorite, a second storage chamber for storing organic acid, and a third storage chamber for storing water, metering means are provided between all chambers, and means for filling are provided to these chambers. Unreacted constituents are removed from the disinfecting solution. Outlet means is provided from the product storage chamber to the pressurized contact chamber where the disinfecting solution is contacted with the water and/or wastewater.

10 Claims, 2 Drawing Sheets

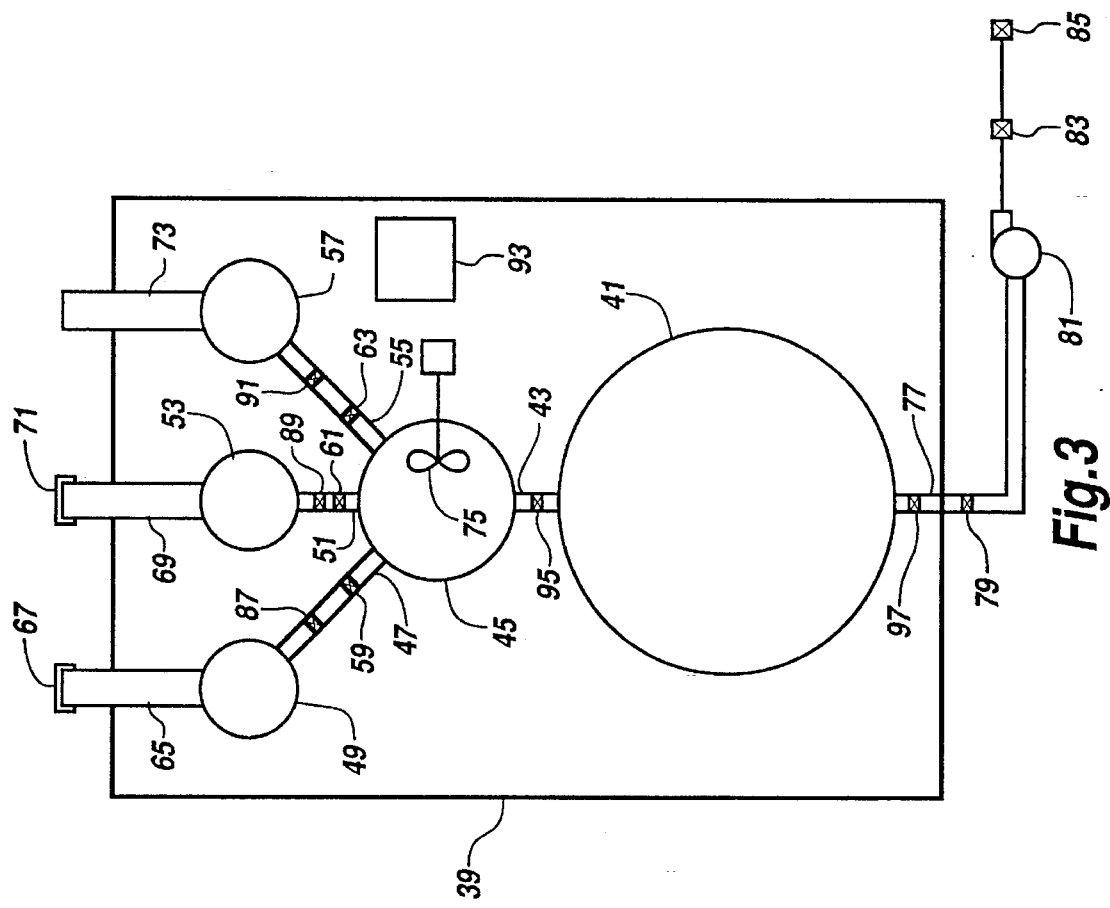
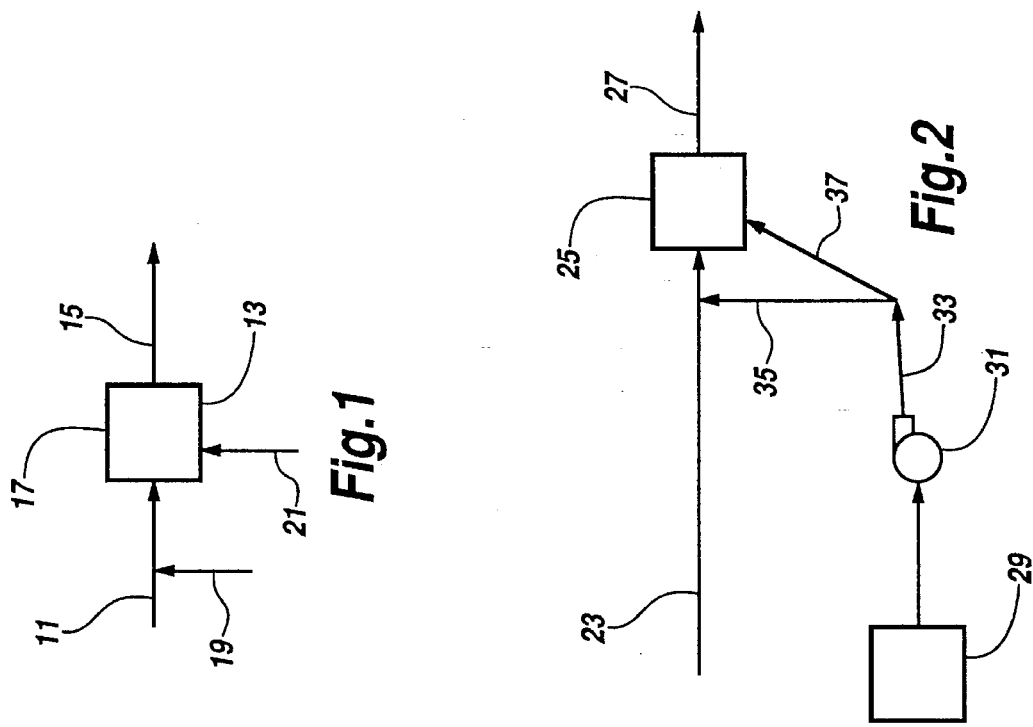

METHOD AND APPARATUS FOR TREATING AND DISINFECTING WATER AND/OR WASTEWATER

This application is a continuation in part of Ser. No. 08/352,583 filed Dec. 09, 1994, abandoned, which is a continuation in part of Ser. No. 08/065,402 filed May 24, 1993, abandoned, which is a continuation in part of application Ser. No. 07/898,509 filed Jun. 15, 1992, abandoned, which is a continuation in part of application Ser. No. 07/876,292 filed Apr. 30, 1992, abandoned, which is a continuation in part of application Ser. No. 07/763,185 filed Sep. 20, 1991, now U.S. Pat. No. 5,122,282, which is a continuation in part of application Ser. No. 07/579,167 filed Sep. 7, 1990, abandoned, which is a continuation in part of application Ser. No. 07/438,847 filed Nov. 20, 1989, abandoned.

BACKGROUND OF THE INVENTION

This invention generally relates to a method and apparatus for treating and disinfecting water and/or wastewater which also comprises generating various chlorine containing compounds, e.g. chlorine dioxide, on-site. Applicant's prior U.S. Pat. Nos. 5,171,441 and 5,122,282 disclose an apparatus and method, respectively, for treating and disinfecting water and/or wastewater. However, while these prior patents disclose a vessel containing the disinfecting solution (See Item 61, FIG. 6, U.S. Pat. Nos. 5,171,551 or 5,122,282), neither comprise an on-site generator of the disinfecting solution. Thus, the present application is an improvement of Applicant's prior U.S. Pat. Nos. 5,171,441 and 5,122,282.

Methods and/or apparatuses for treating water and/or wastewater with chlorine dioxide produced from mixing organic acids and chlorites have been described in the prior art. Callerame, in Canadian Patent No. 959,238, described a method and apparatus for producing chlorine dioxide in water. Capuano, et al., in U.S. Pat. No. 4,542,008, disclosed a process for the production of chlorine dioxide by the electrolysis of an aqueous solution of sodium chlorite. Hicks, in U.S. Pat. No. 4,590,057, disclosed a process for generating chlorine dioxide by reaction of a metal chlorite with an oxidizing agent such as gaseous chlorine. Rapson, et all, in U.S. Pat. No. 4,534,952, disclosed a chlorine dioxide generator using an inorganic acid and a solution of sodium chlorate and sodium chloride. Ratigan, in U.S. Pat. No. 4,250,144, disclosed a system for generating chlorine dioxide for disinfecting water or wastewater. Tice, et al., in U.S. Pat. No. 4,585,482, described a long-acting biocidal composition produced from a chlorine dioxide-liberating compound and an organic acid. Key, et al., in U.S. Pat. No. 4,310,425, described a system of producing chlorine dioxide for use as an anti-bacterial agent in oil field drilling fluid. Wentworth, in U.S. Pat. No. 3,082,146, described a method for the treatment of water using a residual chlorous acid concentration by mixing therewith sodium chlorite and a peroxygen compound. Alliger, in U.S. Pat. No. 4,084,747, described a germ-killing composition produced by contacting lactic acid with sodium chlorite in an aqueous media. Alcide Corporation, in International Application No. PCT/US 85/00470, described a process for disinfecting a substrate comprising a chlorine-dioxide liberating compound, such as sodium chlorite, with sufficient organic acid to lower the pH of the composition to less than about 7.

Mason, in U.S. Pat. No. 4,968,501, described a novel method of using chlorous acid to remove sulfur dioxide from exhaust combustion gases. Mason, in U.S. Pat. No. 4,801,353, described a method of bleaching wood pulp using an aqueous solution containing a salt of lactic acid and chlorous acid.

Mason, in U.S. Pat. No. 4,925,645, described a process for producing a mixture containing chlorine dioxide which comprised several steps. Mason, in U.S. Pat. No. 4,892,148, described a process of oil recovery including the steps of injecting flooding water into oil bearing subterranean formations which waters contained a mixture of salt of lactic acid and chlorous acid.

Mason, in U.S. patent application Ser. No. 07/755,825 filed Sep. 6, 1991 (which issued as U.S. Pat. No. 5,171,441), No. 07/763,185 filed Sep. 20, 1991 (which issued as U.S. Pat. No. 5,122,282), and No. 07/876,292 filed Apr. 30, 1992 described an apparatus and/or method for treating water and/or wastewater using aqueous solutions prepared from the reaction of an organic hydroxy acid or a carboxylic acid with a chlorite of an alkali metal or alkaline earth metal.

SUMMARY OF THE INVENTION

According to the invention there is provided an apparatus and method for forming chlorine dioxide in an aqueous solution from the reaction of an organic hydroxy acid or carbolic acid with a chlorite of an alkali metal or alkaline earth meatal to yield a salt of the organic acid and chlorous acid. The reaction is carried out at a pH less than about 7 and at a temperature of less than about 120 degrees F. (48.9 degrees C.) most preferably at about 62 degrees F. (16.7 degrees C.). The aqueous solution containing chlorine dioxide formed from the aforementioned reaction is stable and can be safely transported by common carrier, e.g., tank truck or railway tank car. Lab tests have indicated that solutions made by mixing different organic acids, including lactic, citric, malic and tartaric acid, with sodium chlorite retained their concentrations within plus or minus 2% for at least 30 days.

An apparatus and method is provided for generating a mixture containing chlorine dioxide having a main product storage chamber connected to a mixing chamber which is connected to a first storage chamber for chlorite, a second storage chamber for organic acid, and a third chamber for water, metering means are provided between all these chambers, and means for filling are provided to these chambers. Outlet means is provided from the main storage chamber to the point of application of the disinfecting solution.

The aforementioned reaction initiates a chain of reactions leading to the production of chlorine dioxide which is believed to be a central chemical agent of the present invention which makes it effective for the treatment and disinfection of water and/or wastewater. These further reactions, generally, involve the oxidation of various organic compounds or destruction of pathogens, e.g., bacteria and viruses, by either chlorous acid, chloric acid, chlorine dioxide or chlorine gas and will be further described by use of chemical equations in a following section of this specification.

The aqueous solutions containing the chlorine compounds are then injected, mixed with or contacted with water and/or wastewater in some type of container, conduit, pipe, chamber, vessel or other enclosed space or cavity so that the chlorine compounds become thoroughly mixed with the water and/or wastewater for sufficient time so that treatment and disinfection of the water and/or wastewater occurs.

A key element and claim of the present invention concerns the construction and operation of the container, chamber or vessel wherein the chlorine compounds are contacted with the water and/or wastewater. According to the present invention, the chamber or other enclosed space must be constructed and operated so that it provides an airtight or sealed chamber for a period of time effective or sufficient for the treatment and disinfection to occur. Furthermore, the chamber may be constructed and operated so that the surface of the water and/or wastewater contained therein is under a pressure greater than atmospheric pressure. It is believed that having the chamber be airtight or under a pressure greater than atmospheric is partially responsible for the unexpectedly rapid and high levels of treatment and/or disinfection resulting from the present invention, probably due to the fact that the individual molecules of the chlorine containing compounds are prevented and/or minimized from escaping from the water and/or wastewater, and held in close contact with the individuals molecules of the water and/or wastewater. The increased pressures may also cause a greater amount of the chlorine containing compounds to dissolve in the water and/or wastewater.

It is believed that pressures in the range of about 1 to about 2 atmospheres are preferable to insure rapid and efficient treatment and yet be compatible with existing structures and construction techniques. Also, note that the pressure may vary due to the diurnal flow variation.

As previously mentioned, typical existing chlorine contact chambers in widespread use currently are constructed normally of steel or concrete and are open. Therefore, in order to retrofit existing structures according to the present invention the existing open chambers would have to be closed and a method of applying a pressure to the contents contained in the chamber would have to be adapted to the existing chamber. It is therefore critical that the present invention be compatible with existing chambers to make the retrofitting of the existing chambers economically feasible. Since the chlorine contact chambers currently existing are frequently constructed of concrete, they cannot stand high internal pressures without leaking, cracking or possibly having a structural failure. Therefore, it is essential that the internal pressures be maintained in a relatively low pressure range.

The basic design and construction of chlorine contact chambers has been essentially unchanged for the last thirty to forty years. Open contact chambers are in widespread use throughout the nations of the developed world. The present invention is a marked improvement over the existing art and represents a major design, construction and operation improvement which can lead to major cost savings in the construction and operation of disinfection chambers used either by themselves or in conjunction with the water and/or wastewater treatment systems.

Note that it may be feasible to substitute other alkali metal or alkaline earth metal chlorites in either liquid or solid form as a source of the chlorite referred to in this specification.

It may also be possible to use chlorine, chlorine gas, ozone, hydrogen peroxide and/or chlorine dioxide made by any method and other disinfectants in conjunction with the present invention.

Advantages of the present invention over the prior art include: (1) it may be battery powered and therefore portable enabling it to be moved from site to site; (2) its generally small size enables it to be used on various sized applications, e.g., swimming pools, small water supply systems, and packaged treatment systems; (3) it is not necessary for it to operate continuously; and, (4) it's mechanisms may be activated by water pressure and/or flow thereby alleviating an outside power supply.

BRIEF DESCRIPTION OF DRAWINGS

FIG. 1 is a schematic representation of certain elements of the present invention.

FIG. 2 is a schematic representation of certain elements of the present invention.

FIG. 3 is a schematic representation of certain elements of the present invention.

DETAILED DESCRIPTION OF EMBODIMENT(s)

Figure 4:
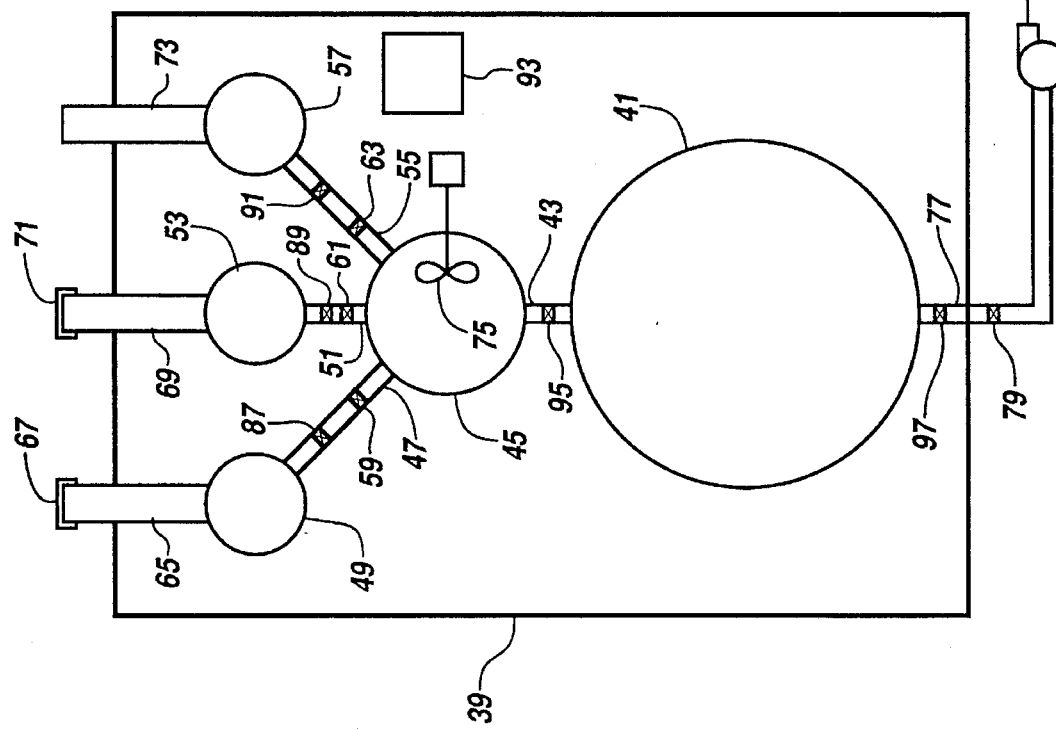
FIG. 4 is a schematic representation of an exemplary embodiment of the present invention.

A more detailed description of the present invention follows in the form of chemical equations and examples.

The reactions utilized in the method of the present invention are believed to be as follows:

1. $CH_3CH(OH)COOH + NaClO_2 \longrightarrow$
   (lactic acid)   (sodium chlorite)

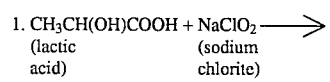
   $CH_3CH(OH)COONA + HClO_2$
   (salt of lactic acid)   (chlorous acid)

It is believed that citric, malic, tartaric, glycolic, oxalic, and mandelic acid may be substituted for lactic acid.

2. a. $HClO_2$ + Non fully Oxidized Organics $\longrightarrow$
   (chlorous acid)   or Inorganics

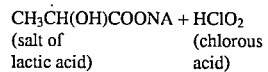
   HClO + Oxidized Organics or Inorganics
   (Hypochlorus acid)

2. b. $2HClO_2 \longrightarrow HClO + HClO_3$
   (chlorous acid)   (Hypochlorus acid)   (chloric acid)

(This reaction occurs in absence of chloride ion)

This reaction 2.b. is not desirable, but it will occur simultaneously with reaction 3., but not necessarily at the same rate.

3. $HClO + 2HClO_2 \longrightarrow 2ClO_2 + H_2O + HCl$
(This reaction occurs in absence of chloride ion)

4. $ClO_2$ + Non Fully $\longrightarrow HClO_2$ + Oxidized Organics
Oxidized Organics   or Inorganics
or Inorganics Reaction 3. provides chloride ions, therefore the following reaction occurs:

5. $HClO + Cl^- + H^+ \rightleftharpoons Cl_2 + H_2O$
The Chlorine reaction with organics or Inorganics is generally thought to be primarily an Oxidation as follows:

6. $Cl_2$ + Organics or Inorganics $\longrightarrow$ Oxidized Organics or Inorganics The above reactions are generally carried out at a pH less than 7.

In practice, the reactants and reactions are produced by mixing bulk quantities of sodium chlorite and certain organic acids. Furthermore, it is believed that in the above reaction Number 1. that citric, malic, tartaric, glycolic, oxalic and mandelic acids may be substituted for the lactic acid to produce a salt of the acid and chlorous acid in an aqueous solution.

The above reaction Number 1. is accomplished by mixing the reactants together at atmospheric pressure in an aqueous solution with the water temperature being approximately 62 degrees F. being in the range of 60 degrees F. to 80 degrees F. The higher water temperatures nearing 80 degrees F. can be used if necessary to increase the reaction speed. Higher water temperatures may be feasible.

The aqueous solutions of the chlorine containing compounds produced by the aforementioned reactions may be prepared according to the following steps: (a) a first solution is formed by adding an organic acid into the water in a reaction vessel; (b) thereafter the first solution is mixed by stirring; (c) a second solution is then formed by introducing sodium chlorite into the first solution, this addition being followed by additional mixing; (d) the second solution is then stirred and mixed. Note that it is believed that several different organic acids may be used to produce the aqueous solutions for the production of the chlorine containing compounds. Also note that the chlorine containing compounds formed by these reaction steps is known to be very stable as aforementioned. It is believed that the aforementioned steps for producing the chlorine containing compounds are critical in order to assure that the mixtures have all of the properties of the present invention.

It should be noted that the aforementioned reactions result in a mixture of species of compounds which is believed to include chlorous acid, chloric acid, chlorine dioxide or chlorine; it is further believed that the powerful oxidation and/or disinfection nature and characteristics of the present invention is due to a mixture of these compounds acting either jointly or singularly, or, acting as a mixture of these chemical substances.

The aqueous solutions containing the chlorine compounds are then injected, mixed with or contacted with water and/or wastewater in some type of container, conduit, pipe, chamber, vessel or other enclosed space or cavity so that the chlorine compounds become thoroughly mixed with the water and/or wastewater for sufficient time so that treatment and disinfection of the water and/or wastewater occurs.

It is expected that the aqueous solution of the chlorine containing substances would normally be injected following the typical primary, secondary or tertiary water and/or wastewater treatment system, i.e., where final chlorination is normally accomplished. However, other points of injection are likely also, e.g., prior to primary sedimentation.

The above reactions produces aqueous solutions containing very high concentrations of chlorine dioxide ranging from generally about 4,000 ppm to about 80,000 ppm. Furthermore, the chlorine dioxide produced by the present invention appears to have more oxidizing and pathogen destroying power on a per unit basis than chlorine dioxide produced by other methods. Mixtures of about 4,000 ppm to about 6,000 ppm chlorine dioxide commonly occur in these solutions.

Turning to FIG. 1, one exemplary schematic embodiment of some of the basic elements of the present invention is shown. At 11, the influent line or inlet line to the contact chamber is shown with the contact chamber, or mixing vessel 13.

The effluent discharge line or outlet line is shown at 15. Note that the pressure of the contents of the mixing vessel is greater than about one atmosphere and that the detention time is about 30 seconds to about 5 minutes.

It is believed that means for increasing the pressure on the surface of the water and/or wastewater in the contact chamber to a pressure greater than atmospheric could include sizing and/or valving the exit or effluent outlet line, 15, so that it could carry less flow than the entrance or influent line, 11. Additionally, some type of mechanical means, e.g., a pump, could be used at, 17, to put pressure on the contact chamber. Note that the aqueous solution of disinfectant could alternatively be injected into the influent line, 11, either through the single line 19 or into the chamber, 13, through the single line 21. Note that Applicant's prior U.S. Pat. No. 5,171,441 and 5,122,282 disclose additional details which may be relevant to the present invention.

Turning to FIG. 2, there is shown another schematic embodiment of additional elements or applicant's invention. There is shown an influent line, 23, to a contact chamber, 25, having an effluent line, 27. Additionally, there is shown a product storage vessel, 29, which contains the aqueous solution of the chlorine containing disinfecting compounds, connected to an influent pump, 31, through the connecting line, 33, connecting thereto alternatively to the influent line, 23, through the line 35 or alternatively, to the contact chamber, 25, through line 37. As stated previously, it would be possible to inject the aqueous solution of disinfectant through line 35 into the influent line, 23, or directly into the contact chamber, 25, through the line, 37. Note in FIG. 2 that the influent line, 23, the contact chamber, 25, the effluent line, 27, the line, 35, and the line, 37, are comparatively shown in FIG. 1 as elements 11, 13, 15, 19 and 21, respectively.

Turning to FIG. 3, a schematic embodiment of additional elements of the present invention is shown. At 39, an insulated housing containing most of the components of the present invention is shown. Therein is shown the airtight main or, product, or disinfectant storage chamber or vessel, 41, having fluid connecting means, conduit or pipe, 43, to the product or disinfectant mixing chamber, 45. The mixing chamber, 45, has fluid connecting means, conduit or pipe, 47, to a first storage chamber, 49, for storing sodium chlorite and fluid connecting means, conduit or pipe, 51, to a second storage chamber 53, for storing an organic acid. The mixing chamber, 45, also has fluid connecting means, conduit or pipe, 55, to a third storage chamber, 57, for storing water. Note that the third storage chamber, 57, could be replaced by or connected to a constant source of water, e.g., a city water supply system. Check valves, 59, 61 and 63 are provided between the mixing chamber, 45, and the first storage chamber, 49, the second storage chamber, 53, and the third storage chamber, 57, respectively. The storage chamber, 49, is equipped with a fill pipe, 65, having a breather cap, 67. The storage chamber, 53, is equipped with a fill pipe, 69, having a breather cap, 71. The storage chamber, 57, is equipped with a means for filling, e.g., a fill pipe, 73.

The mixing chamber, 45, is equipped with means, e.g. mechanical means, 75, for mixing and stirring its contents. The product storage vessel or chamber, 41, has an outlet line, 77, possibly equipped with a check valve, 79, having a pump, 81, to transfer supply and/or meter the mixture of chlorine containing substances to the application point. Another check valve, 83, may be located on the downstream side of the pump, 81. The outlet line, 77, transfers the chlorine containing substances to the application point through some sort of metering means, e.g., a venturi type valve, 85. Means for metering and/or supplying the effective and appropriate amount of liquid which flows from the storage chamber, 49, the storage chamber, 53, and the storage chamber, 57, into the mixing chamber, 45, are located at 87, 89 and 91, respectively. Means, 93, for heating the enclosure, 39, is also shown.

Also shown therein is some type of means, device, apparatus, method or process for filtering, removal and/or treatment means, e.g., reverse osmosis, membrane or micron filters or a nitrogen sweep filtering system or means or other method or means, which may be located alternatively at point 95 or 97 for removing from the disinfecting solution various types of impurities an/or unreacted constituents or byproducts, e.g., chlorites and/or chlorates or other undesirable impurities or unreacted constituents byproducts.

In operation, the storage chambers for the sodium chlorite, 49, organic acid, 53, and water, 57, are filled. Thereafter, predetermined amounts from these three chambers are then metered into the mixing chamber, 45, in the proper sequence and amounts for mixing. After mixing, the mixture of disinfectant is transferred to the airtight product storage vessel, 41, and dispensed through the outlet line, 77, to the point of application, 85, as needed.

Turning to FIG. 4, therein is shown an exemplary embodiment of the major elements of the present invention in operative connection. FIG. 4 merely shows the major elements of FIG. 3 connected to the major elements of FIG. 2. Note that elements 29, 31, and 33 of FIG. 2 are identified as elements 41, 81, and 77, respectively, of FIG. 3. All of the elements of FIG. 4 will not be discussed again, since they can be identified from a review of FIG. 3.

Turning to FIG. 4, therein is shown the product storage vessel, 41, the disinfectant supply line, 77, and the disinfectant influent pump, 81. Also shown are the influent line, 99, the contact chamber, 101, and the effluent line, 103. As explained earlier, the disinfecting solution may be applied alternatively through lines 105 or 107.

It should be understood that the teachings of this specification are given by way of illustration and explanation thereof and not by way of limitation because many changes in the invention may be effected without departing in anyway from the scope and spirit of this invention as disclosed in the description, drawings and claims contained herein.

I claim:

1. An apparatus for treating and disinfecting water and/or wastewater comprising:
   (a) a rectangular housing;
   (b) said housing being free standing;
   (c) said housing being insulated;
   (d) said housing having means for being heated;
   (e) a product storage chamber;
   (f) a first mixing chamber;
   (g) fluid metering means being provided between said product storage chamber and said first mixing chamber;
   (h) a source of sodium chloride and a first storage chamber for storing said sodium chlorite;
   (i) fluid metering means being provided between said first storage chamber and said first mixing chamber;
   (j) a source of organic acid and a second storage chamber for storing said organic acid;
   (k) fluid metering means being provided between said second storage chamber and said first mixing chamber;
   (l) a third storage chamber for storing water;
   (m) fluid metering means being provided between said third storage chamber and said first mixing chamber;
   (n) filling means being provided to said first storage chamber;
   (o) filling means being provided to said second storage chamber;
   (p) filling means being provided to said third storage chamber;
   (q) said first mixing chamber being equipped with means for mixing;
   (r) said storage chamber having outlet means for dispensing the mixture containing disinfecting solution;
   (s) a source of water and/or wastewater to be disinfected and a contact chamber for mixing the disinfecting solution and said water and/or wastewater;
   (t) said chamber having an inlet line and an outlet line for the water and/or wastewater;
   (u) means containing an aqueous solution of (1) an organic hydroxy acid or carboxylic acid and (2) an alkali metal or alkaline earth metal chlorite;
   (v) means for filtering the disinfecting solution wherein unreacted constituents are removed from the disinfecting solution;
   (w) means for providing said aqueous solution to said contact chamber;
   (x) said contact chamber being sized to provide a detention time of no more than 5 minutes for the water and/or wastewater;
   (y) said contact chamber being sealed from the atmosphere; and
   (z) said contact chamber having means for providing a pressure of greater than 1 atmosphere on the contents of said contact chamber, said apparatus thereby effective to destroy substantially all bacteria, microbes and other pathogenic organisms in said water and/or wastewater.

2. The apparatus of claim 1, wherein said filtering means further comprises a membrane filter.

3. The apparatus of claim 1, wherein said filtering means further comprises a micron filter.

4. The apparatus of claim 1, wherein said filtering means further comprises a reverse osmosis filtering means.

5. The apparatus of claim 1, wherein said filtering means further comprises a nitrogen sweep filtering means.

6. A method for treating and disinfecting water and/or wastewater:
   (a) providing a rectangular housing;
   (b) said housing being free standing;
   (c) providing insulation for said housing;
   (d) providing heat for said housing;
   (e) providing a product storage chamber;
   (f) providing a first mixing chamber;
   (g) providing fluid metering means between said product storage chamber and said first mixing chamber;
   (h) providing a first storage chamber for storing sodium chlorite;
   (i) providing fluid metering means between said first storage chamber and said first mixing chamber;
   (j) providing a second storage chamber for storing organic acid;
   (k) fluid metering means being provided between said second storage chamber and said first mixing chamber;
   (l) providing a third storage chamber for storing water;
   (m) fluid metering means being provided between said third storage chamber and said first mixing chamber;
   (n) filling means being provided to said first storage chamber;
   (o) filling means being provided to said second storage chamber;

(p) filling means being provided to said third storage chamber;

(q) said first mixing chamber being equipped with means for mixing;

(r) said product storage chamber having outlet means for dispensing the mixture containing disinfecting solution;

(s) filtering said disinfecting solution whereby unreacted byproducts are removed;

(t) removing unreacted byproducts from the disinfecting solution;

(u) introducing into a contact chamber containing said water and/or wastewater an aqueous solution prepared by mixing at a pH of less than 7 and at a temperature less than 120 F. (1) an organic hydroxy acid or carboxylic acid and (2) an alkali metal or alkaline earth metal chlorite;

(v) sealing the contents of said contact chamber from the atmosphere;

(w) pressuring the contact chamber to a pressure above atmospheric pressure;

(x) detaining the contents of said contact chamber for a period of time no more than 5 minutes whereby substantially all bacteria, microbes and other pathogenic organisms are destroyed in said water and/or wastewater.

7. The method of claim 6, wherein said unreacted byproducts are removed from the disinfecting solution by membrane filtration.

8. The method of claim 6, wherein said unreacted constituents are removed from the disinfecting solution by micron filtration.

9. The method of claim 6, wherein said unreacted constituents are removed from the disinfecting solution by reverse osmosis.

10. The method of claim 6, wherein said unreacted constituents are removed from the disinfecting solution by a nitrogen sweep.

* * * * *